Patented July 2, 1946

2,403,172

UNITED STATES PATENT OFFICE 2,403,172

ART OF MOLDING RESINS OF VINYL TYPE

Walter S. Crowell, Melrose Park, and George W. Birch, Upper Darby, Pa., assignors to The S. S. White Dental Manufacturing Company, Philadelphia, Pa., a corporation of Pennsylvania No Drawing. Application June 30, 1939, Serial No. 282,060

8 Claims. (Cl. 260—36)

Vinyl ester polymer resins have many valuable characteristics, with respect to resistance to water and to various chemicals, and many industrial applications are possible in producing molded articles and shapes. It has been proposed to form articles from materials containing vinyl ester polyer resins as the effective base, and these proposals have included the steps of pre-forming a vinyl ester polymer resin by condensation or polymerization of such vinyl esters as vinyl acetate and vinyl chloride, sometimes individually but usually in mixtures containing from 10 to 90 percent of each of these esters. It has been found that the inter-polymer can be more easily worked or has more valuable properties than either individual polymer, because the acetate acts as an inner plasticizer of the chloride and the chloride acts as a hardener and toughener of the acetate, and because the polymerized vinyl chloride tends to form aggregates of higher molecular weight, while the vinyl acetate is relatively weaker and softer and yields more readily to various solvents, and even permits the penetration of moisture under some conditions.

It has been sought to remedy some of the defects of vinyl resins by so conducting the polymerization or interpolymerization that molecules of great molecular weight are produced, in association with molecules of lesser condensation, and to separate the resultant mixture and employ the portion having the greater molecular weight, as a more stable and resistant resin base.

Further, it has been proposed to employ certain stabilizers such as calcium stearate for the purpose of preventing decomposition of the vinyl ester polymer resins, which tends to form an acid when heated, and this acid acts as a catalyst for further decomposition.

Such vinyl ester polymer resins are present as a tough substance which requires a temperature in excess of 300 to 310 degrees F. for effecting the union and molding of articles. As the vinyl resins begin to scorch or decompose when heated to around 315 degrees F., it has been found that articles made from such vinyl ester polymer resins, without added coloring matter, are usually of a brownish shade, indicating that decomposition has commenced during the molding operation.

In this description and in the claims, by "vinyl ester polymer resins" are meant resins produced by polymerization of vinyl esters, vinyl chloride being considered a vinyl ester.

According to the present invention, it is proposed to mold the vinyl ester polymer resin in the form of a plasticized mass, employing as a plasticizer therefor a material which is liquid at room temperature and has the characteristic of itself polymerizing with commercially-acceptable rapidity at the molding temperature, so that the final article is of rigid form and has the usual attributes of resins of the vinyl ester polymer type.

This effect may be produced by employing monomeric methyl methacrylate as the plasticizing agent, in a proportion approximating 10 to 40 percent of the mixture. This monomeric methyl methacrylate does not substantially dissolve the types of vinyl ester polymer resins which contain relatively high proportions of vinyl chloride—that is, those which tend to have the highest molecular weight.

Thus, with an excess of monomeric methyl methacrylate (15 percent of vinyl ester polymer resin, 85 per cent of monomer liquid), the particles of vinyl ester polymer resin retain their individuality and form, but are greatly swollen and softened, and appear to float easily in the monomer liquid, and settle slowly owing to a relatively small difference in specific gravities; very little of the vinyl ester polymer resin appears to enter into true solution.

On the other hand, the monomeric methyl methacrylate penetrates into and softens these materials by a swelling action, so that the consistency at, say, 35 to 40 percent of monomeric methyl methacrylate is that of a hand-plastic gum which is not sticky or tacky but which may be readily twisted and bent in the fingers at room temperature, and thus may be readily cut and shaped for packing into molds, and readily yields under pressure to fill the molds before being heated for final consolidation and hardening.

The precise percentage of monomeric methyl methacrylate to be employed depends upon the product to be made, and the conditions of operation which are feasible for its production. For example, in preparing articles such as cigarette cases or the like in quantity, it is possible to use steel molds which are resistant to temperature and pressure conditions; and for such purposes it has been found that 10 percent of monomeric methyl methacrylate with 90 percent of pre-condensed vinyl ester polymer resin is satisfactory, and permits ready molding at temperatures of 293 degrees F. or lower, and produces strong, tough articles under a pressure of, say, 2500 pounds per square inch.

The mixtures containing the higher percentages of monomeric methyl methacrylate are of particular advantage where it is necessary to follow irregular molds, and where the operation must be conducted at relatively low temperatures. For example, when it is sought to make a denture, it is presently necessary to utilize molds which accurately reproduce the walls of the oral cavity upon which the denture is to be seated; and it is customary to employ plaster molds for the purpose. Such plaster molds are weak and do not withstand high pressures or temperatures in the molding and condensing operations. It has been found, therefore, that mixtures containing 30 to 40 percent of the methacrylate monomer are highly advantageous for such employments, and it is presently preferred to employ mixtures containing 35 percent of the methacrylate monomer. On the other hand, such dentures have to withstand temperatures as high as 140 degrees F. in the mouth, and sometimes temperatures as high as 160 degrees F. The softening points of the aforesaid mixtures, after proper hardening, make them excellently adapted for use as dentures, as the material employed as a plasticizer during the forming operation is later converted to a resin itself.

Such a mixture may be prepared in various ways. It has been found feasible, for example, to produce a substantially transparent mass by grinding vinyl resin crepe (rolled vinyl ester polymer resin in sheets about one-fiftieth of an inch thick) in a cutting grinder, and separating the portion which passes a ten-mesh screen but is retained by a forty-mesh screen. Usually there is very little dust or fine particles in such an operation: if any dust is formed, it can be returned to the mixture or to the creping rolls. Such coarse vinyl ester polymer resin granules are weighed out, and the proper quantity of liquid monomeric methyl methacrylate is introduced with them into a closed tumbling drum, and the tumbling drum is then caused to operate until the monomeric methyl methacrylate has apparently disappeared. The granules have become somewhat softer and are more easily bent when ten percent of monomeric methyl methacrylate is thus employed. When thirty percent is employed, the particles become rubbery and very flexible.

This tumbling operation assists and facilitates the proper mixing of the granules and liquid, and prevents the possibility of non-uniform swelling of the granules. It has been found, however, that this tumbling operation is not so successful when the granules are as small as sixty-mesh, as the relatively greater surface areas of such small granules cause them individually to accept immediately a greater proportion of the methacrylate liquid than the larger granules, and irregularity of penetration and swelling occurs: sometimes this results in a decrease of strength of the article, or in an irregularity in the formation of the surface of the article in following fine crevices or elevations on the mold.

It is feasible to color such materials as for example by utilizing pigmentary colors in forming the original vinyl ester polymer resin crepe, or by using colors which are soluble in the methacrylate liquid during the course of the tumbling operation. Further, it is possible to prepare various batches of different colors, and then selectively or indiscriminately fill the mold with such particles of differing colors.

A mixture of 10 percent of monomeric methyl methacrylate with 90 percent of highly polymerized vinyl ester polymer resin can be molded at a temperature of 293 degrees F. or below and hardens in about 10 minutes at this temperature. A mixture of 30 percent monomeric methyl methacrylate with 70 percent of highly polymerized vinyl ester polymer resin can be molded at room temperature and hardened at 266 degrees F. A mixture of 35 percent of monomeric methyl methacrylate with 65 percent of vinyl resin can be molded at room temperature and hardened at 250 degrees F. in about 30 minutes. In each instance, 0.05 percent of benzyl peroxide is added as a catalyst (based on the monomer).

The following examples of the procedure and of the articles formed thereby indicate the effects of proportions and conditions. For each of the colums below, a particular mixture was provided, molded and cured, and the tests indicate the behavior of successive specimens produced from these proportions and under these conditions.

| | Sample No. | | | | |
|---|---|---|---|---|---|
| | 1 | 2 | 3 | 4 | 5 |
| Vinyl ester polymer resin | 100 | 90 | 70 | 65 | 60. |
| MMA monomer | 0 | 10 | 30 | 35 | 40. |
| Stabilizer____percent | 1.0 | 0.9 | 0.7 | 0.65 | 0.6. |
| Catalyst percent (based on monomer) | 0 | 0.05 | 0.05 | 0.05 | 0.05. |
| Mixing process | | Tumbling | | | Banbury. |
| Moulding temperature | 320° F. | Room | Room | Room | Room. |
| Curing temperature, ° F. | 0 | 295 | 266 | 250 | 250. |
| Curing time minutes | 0 | 30 | 30 | 60 | 60. |
| Color | Clear brown | Clear—to translucent | | | |
| Defects | None | None | None | None | None. |
| Transverse strength p. s. i. | 6,900 | 13,300 | 10,300 | 15,800 | 19,500. |
| | 14,200 | 14,600 | 12,200 | 17,700 | 19,600. |
| | 15,200 | 15,400 | 13,800 | 18,600 | 20,000. |
| | 16,600 | 15,400 | 15,800 | 19,600 | 20,100. |
| Average | 13,200 | 14,700 | 13,000 | 17,900 | 19,800. |
| Izod impact inch lbs./sq. in | 26 | 123 | 84 | 153 | 247. |
| | 48 | 132 | 106 | 153 | 255. |
| | 48 | 138 | 130 | 165 | 257. |
| | 141 | 141 | 135 | 169 | 270. |
| Average | 66 | 134 | 114 | 160 | 258. |

MMA designating methyl methacrylate.

From these examples, it will be noted that the strength is more uniform, and that the transverse strength and impact strength have been increased by the procedure, partly because of the addition of the methacrylate monomer, which permits molding of the vinyl resin without decomposition and upon polymerization leads to improvement of these strengths over the strengths obtainable when non-polymerizable plasticizers are used, and partly by the kind and proportionation of the stabilizer employed. In each of these examples, the vinyl ester polymer resin was a high-chloride, high-molecular-weight resin, and the catalyst employed was benzoyl peroxide: and the stabilizer was triphenyl tin hydroxide.

The presence of the material in the form of individual granules is excellent for employment in making dentures, as it can be supplied in sealed containers and utilized by the dentist, in its granular form, for filling a mold which is then subjected to heat and pressure for the shaping, uniting and hardening. The stabilized material has a substantial shelf-life, as pointed out hereinafter, and it is feasible to re-plasticize it by a further tumbling operation with more methacrylate liquid, as the time-hardening has merely changed the methacrylate monomer into methacrylate polymer which itself is a resin.

In addition to the use of the tumbling operation for producing a bulk of granules, it is also feasible to introduce the vinyl ester polymer resin in crepe or granule form into a Banbury mill (preferably with cooling of the mill by cold water to avoid polymerization of the monomer), along with the desired quantity of methacrylate monomer, with the usual precautions, and work them together to a homogeneous mass. The swelled granules produced by the tumbling operation, or by the mere standing of vinyl ester polymer resin granules in methacrylate monomer, can be similarly worked up into a substantially homogeneous mass. Fillers, opaquing-agents, and coloring material may be introduced during the working on the Banbury mixer. One product thus obtained with 30 percent of monmeric methyl methacrylate, for example, is a rubbery mass which is hand-plastic, can be readily cut with shears or a knife, can be bent with the fingers for packing into a mold, and hence is easily handled for cold-molding into preshapes which can be employed in a hot final-molding operation for the easy production of stable articles; and can also be employed directly in packing denture molds, for example.

The methyl methacrylate monomer tends to shrink about 20 percent in volume during the course of its hardening, and the shrinkage of mixtures originally containing around 35 percent of the monomer liquid will therefore amount to about 7 percent of the total volume, or a linear shrinkage of about 2½ percent, which closely approximates the shrinkage of rubber during the course of vulcanizing. This shrinkage, however, is overcome by molding and hardening under high pressures, or by using molds which follow up as the contents shrink.

Reference has above been made to the desired presence of stabilizers in such materials. It has been found that calcium stearate and other materials which have been accepted as suitable for employment with vinyl ester polymer resins are not proper for inclusion while preparing the aggregate of vinyl resin with polymerized methyl methacrylate, owing to inherent differences between the progenitors of the vinyl polymer and the methacrylate polymer. The vinyl resins upon heating tend to form acids which promote decomposition: and hence various alkalis and salts of acids (such as stearic acid, i. e. normally those weaker than acetic acid) are introduced as stabilizers. These stabilizers are also desirable during the course of polymerization of the vinyl ester polymer resin, as this polymerization is restricted and almost inhibited by the presence of acids. On the other hand, the polymerization of methyl methacrylate is correspondingly inhibited by bases, and is promoted by acids. Thus, there is incompatibility between many normal stabilizers or polymerization-accelerants for resins of the vinyl ester polymer group and resins of the methacrylate group.

It has been found that aluminum hydroxide is a satisfactory stabilizing agent for assuring uniformity of product according to the present method, as it appears to operate satisfactorily both for protecting the vinyl resin and for the purpose of assuring the proper condensation of the methacrylate monomer, and for the preservation of the methacrylate polymer which is formed. In addition, it has been found that triphenyl tin hydroxide (proposed for vinyl resins in French Patent 829,713) is satisfactory, as well as lanthanum and beryllium hydroxides. The quantity of stabilizer to be employed depends somewhat on the molecular condition of the vinyl resin, and upon the particular agent employed.

It has been found that aluminum hydroxide is effective in a proportion of one-twentieth of one percent of the vinyl ester polymer resin present; and that proportions up to 15 percent of the vinyl ester polymer resin may be employed. It is preferred to employ about one-half of one percent when making clear or transparent resin articles: to use between 1 and 2 percent of aluminum hydroxide in forming articles which are to be translucent, as the higher proportions of aluminum hydroxide tend to produce a cloudiness in the mass; while for opaque articles higher percentages may be used, as the excess is chemically inert and operates largely as a filler for the material. The desirability of increasing a relatively low proportion of such a stabilizer is indicated by the appearance of bubbles, or by low or irregular strength in the hardened mass. Proper quantities of other stabilizers can be similarly ascertained; for example, three-tenths of one percent of beryllium hydroxide appears to be the effective minimum.

If handling and processing are carried out with sufficient care and at sufficiently low temperatures, it is not essential to provide stabilizers, since no significant or objectionable decomposition of the vinyl resin will occur; but it is desirable to employ a stabilizer, even if only in small quantities, as it reduces the difficulties of handling and the precautions which must be observed.

The behavior, strength, etc., of the material approaches that of an interpolymer, but differs therefrom in the ease of production, as extensive apparatus and precautions are required in producing interpolymers of vinyl ester polymer and methacrylate resins owing to the low boiling points of the initial vinyl esters; and there is not the capability of simple pressure molding and hardening.

In the above description, monomeric methyl methacrylate has been set out, as it is the presently preferred material for employment: but it will be understood that other acrylic and alkacrylic esters may be employed which have the properties of liquidity at room temperature, ability to swell vinyl ester polymer resins, and remain without excessive volatilization at molding and curing temperatures. Different properties of final articles are obtained, according to the particular ester selected: and some of the bodies remain relatively soft or flexible after hardening, which is of value for some employments. Since many such articles require relative rigidity and great resistance to moisture penetration (such as denture plates, tumblers, and other articles subject to moisture in use), the methyl methacrylate has been set out as the preferred form owing to its excellent properties in these respects.

It is obvious that other combinations than those specifically set out may be employed, and that the steps of the procedure may be modified without departing from the scope of the appended claims.

We claim:

1. The process of producing moldable masses having a synthetic resin base, which comprises treating a high-chloride-content vinyl-ester-polymer resin of interpolymerized vinyl acetate and vinyl chloride with monomeric methyl methacrylate until the vinyl-ester-polymer resin is uniformly swollen but not dissolved, and in the proportion of 10 to 40 percent of monomeric methyl methacrylate in the swollen product.

2. The process of producing moldable masses having a synthetic resin base, which comprises tumbling granules of a high-chloride-content vinyl-ester-polymer resin of interpolymerized vinyl acetate and vinyl chloride with monomeric methyl methacrylate until the vinyl-ester-polymer resin is uniformly swollen but not dissolved, and in the proportion of 10 to 40 percent of monomeric methyl methacrylate in the swollen product, the granules originally being of substantially uniform size and between 10 and 60 mesh.

3. The process of producing moldable masses having a synthetic resin base, which comprises kneading a high-chloride-content vinyl-ester-polymer resin of interpolymerized vinyl acetate and vinyl chloride with monomeric methyl methacrylate, in the proportion of substantially 35 percent of monomeric methyl methacrylate in the kneaded mass, until the monomer is intimately and uniformly distributed as a plasticizer of the vinyl-ester-polymer resin and the mass has a rubbery hand-plastic consistency.

4. The process of producing shaped articles from a mass having a base of vinyl-ester-polymer resins, which comprises treating a high-chloride-content vinyl-ester-polymer resin of interpolymerized vinyl acetate and vinyl chloride with monomeric methyl methacrylate until the vinyl-ester-polymer resin is uniformly swollen but not dissolved, and in the proportion of 10 to 40 percent of monomeric methyl methacrylate in the swollen product, and shaping the swollen mass under pressure and at a temperature not exceeding 300 degrees F. until the polymerization of the methacrylate is effected.

5. A moldable composition consisting of a mass having a synthetic resinous base of high-chloride-content vinyl-ester-polymer resin of interpolymerized vinyl acetate and vinyl chloride in swollen form and containing methyl methacrylate monomer as the swelling agent in the proportion of approximately 10 to 40 percent of the swollen product, said monomer being intimately and uniformly distributed throughout the mass.

6. A moldable composition consisting of a mass having a synthetic resinous base of high-chloride-content vinyl-ester-polymer resin of interpolymerized vinyl acetate and vinyl chloride in swollen form and containing methyl methacrylate monomer as the swelling agent in the proportion of substantially 35 percent of the swollen mass, said monomer being intimately and uniformly distributed throughout the mass.

7. A moldable composition consisting of a mass having a synthetic resinous base of high-chloride-content vinyl-ester-polymer resin of interpolymerized vinyl acetate and vinyl chloride in swollen form and containing methyl methacrylate monomer as the swelling agent in the proportion of substantially 35 percent of the swollen mass, said monomer being intimately and uniformly distributed throughout the mass, together with a stabilizer selected from the group consisting of aluminum hydroxide, beryllium hydroxide and triphenyl tin hydroxide and effective jointly on the vinyl-ester-polymer resin and on the methyl methacrylate.

8. A denture comprising a hard mass having a synthetic resinous base consisting essentially of high-chloride-content vinyl-ester-polymer resin of inter-polymerized vinyl acetate and vinyl chloride and of methyl methacrylate polymer resin, the methacrylate resin being present in the proportion of 10 to 40 percent of the total resin base, and characterized in having uniform properties of strength and having a transverse strength value exceeding 13,000 and an Izod impact strength exceeding 114 and containing not exceeding 2 percent of a stabilizer selected from the group consisting of aluminum hydroxide, beryllium hydroxide and triphenyl tin hydroxide and effective jointly on the vinyl-ester-polymer resin and on the methyl methacrylate.

WALTER S. CROWELL.
GEORGE W. BIRCH.